United States Patent
Griot et al.

(10) Patent No.: US 10,939,338 B2
(45) Date of Patent: *Mar. 2, 2021

(54) RESELECTION BETWEEN REGULAR AND DEDICATED CORE NETWORKS

(71) Applicant: QUALCOMM Incorporated, San Diego, CA (US)

(72) Inventors: Miguel Griot, La Jolla, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,746

(22) Filed: Nov. 25, 2019

(65) Prior Publication Data

US 2020/0092770 A1    Mar. 19, 2020

Related U.S. Application Data

(63) Continuation of application No. 15/171,426, filed on Jun. 2, 2016, now Pat. No. 10,524,171.

(Continued)

(51) Int. Cl.
*H04W 36/00* (2009.01)
*H04W 48/18* (2009.01)
(Continued)

(52) U.S. Cl.
CPC ....... *H04W 36/0072* (2013.01); *H04W 36/22* (2013.01); *H04W 36/385* (2013.01);
(Continued)

(58) Field of Classification Search
CPC .......... H04W 36/0072; H04W 36/385; H04W 48/18; H04W 36/22; H04W 4/70;
(Continued)

(56) References Cited

U.S. PATENT DOCUMENTS 10,524,171 B2 * 12/2019 Griot ................ H04W 36/0072
2006/0245392 A1 * 11/2006 Buckley ................ H04W 48/16
370/331

(Continued)

FOREIGN PATENT DOCUMENTS

CN    101489209 A    7/2009
EP    2007162 A2    12/2008
(Continued)

OTHER PUBLICATIONS

International Search Report and Written Opinion—PCT/US2016/035615—ISA/EPO—dated Oct. 4, 2016.

(Continued)

*Primary Examiner* — Brandon J Miller
(74) *Attorney, Agent, or Firm* — Patterson & Sheridan, LLP

(57) ABSTRACT

Certain aspects of the present disclosure relate to techniques selecting a core network. As described herein, a user equipment (UE) may receive an indication of services provided by a first core network (CN). The UE may take action to reselect from the first CN to a second CN to access a set of services not provided by the first core network. When a UE desires services not available on a currently-connected CN, the UE may transmit an establishment request message requesting the services desired.

29 Claims, 10 Drawing Sheets

Related U.S. Application Data

(60) Provisional application No. 62/180,394, filed on Jun. 16, 2015.

(51) Int. Cl.
  *H04W 36/22* (2009.01)
  *H04W 36/38* (2009.01)
  *H04W 4/70* (2018.01)
  *H04W 60/00* (2009.01)

(52) U.S. Cl.
  CPC .............. *H04W 48/18* (2013.01); *H04W 4/70* (2018.02); *H04W 60/00* (2013.01)

(58) Field of Classification Search
  CPC . H04W 60/00; H04W 36/14; H04W 36/0066; H04W 36/0022
  See application file for complete search history.

(56) References Cited

U.S. PATENT DOCUMENTS

| | | | | |
|---|---|---|---|---|
| 2009/0257417 | A1* | 10/2009 | Allen | .................... H04W 76/22 370/338 |
| 2010/0027468 | A1* | 2/2010 | Rajadurai | ............. H04W 48/12 370/328 |
| 2013/0121241 | A1 | 5/2013 | Sebire | |
| 2015/0098321 | A1* | 4/2015 | Jeong | .................... H04W 76/18 370/230 |
| 2015/0126190 | A1* | 5/2015 | Li | ......................... H04W 8/205 455/436 |
| 2016/0373976 | A1 | 12/2016 | Griot et al. | |

FOREIGN PATENT DOCUMENTS

| | | |
|---|---|---|
| EP | 2763496 A1 | 8/2014 |
| EP | 3051878 A1 | 8/2016 |
| WO | 2008125652 A1 | 10/2008 |
| WO | 2015043050 A1 | 4/2015 |
| WO | 2015045296 A2 | 4/2015 |
| WO | 2015062098 A1 | 5/2015 |

OTHER PUBLICATIONS

Taiwan Search Report—TW105117693—TIPO—dated Feb. 25, 2020.

NTT DOCOMO et al., "Introduce the Dedicated Core Network (DECOR) feature", S2-152107, SA WG2 Meeting #109, May 25-29, 2015, Fukuoka, Japan, May 29, 2015, pp. 1-20, URL:http://www.3gpp.org/ftp/tsg_sa/WG2_Arch/TSGS2_109_Fukuoka/Docs/S2-152107.zip.

* cited by examiner

RESELECTION BETWEEN REGULAR AND DEDICATED CORE NETWORKS

CROSS REFERENCE TO RELATED APPLICATIONS

This application is a continuation of U.S. patent application Ser. No. 15/171,426 filed Jun. 2, 2016, which claims benefit of U.S. Provisional Application Ser. No. 62/180,394, filed Jun. 16, 2015, which are hereby expressly incorporated by reference herein in their entirety.

FIELD OF DISCLOSURE

The present disclosure generally relates to wireless communication and, more particularly, to methods and apparatus for a user equipment (UE) reselecting a core network (CN).

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

Techniques for providing effective coverage for devices, including MTC devices, which may have different characteristics as compared to traditional UEs, are desired.

SUMMARY

Certain aspects of the present disclosure provide a method for wireless communication by a user equipment (UE). The method generally includes receiving information regarding a first set of services provided by a first core network, and taking action to reselect from the first core network to a second core network to access a second set of services not provided by the first core network.

According to aspects, taking the action may include initiating a registration update, wherein the registration update indicates, to a Radio Access Network (RAN) node, a service requested by the UE that is not provided by the first core network. The registration update may not indicate an identifier associated with the first core network.

The identifier associated with the first core network (which may not be included in the registration update) may comprise a Globally Unique MME Identifier (GUMMEI). Generally, the identifier associated with the first core network (which may not be included in the registration update) may include a temporary identifier.

The UE may indicate to the RAN node, a permanent identifier associated with the UE.

The UE may provide information regarding the first core network in a registration update. For exemplary purposes only, the first core network may provide at least one of small data over control plane transmission services or data bearer services.

According to aspects, taking the action may include the UE transmitting a tracking area update (TAU) request message.

Certain aspects of the present disclosure provide an apparatus for wireless communication. The apparatus generally includes means for receiving, by a UE, information regarding a first set of services provided by a first core network, and means for taking action, by the UE, to reselect from the first core network to a second core network to access a second set of services not provided by the first core network.

Certain aspects of the present disclosure provide an apparatus for wireless communication. The apparatus generally includes a receiver, at least one processor and a memory coupled to the at least one processor. The receiver is generally configured to receive information regarding a first set of services provided by a first core network, and the at least one processor is generally configured to take action to reselect from the first core network to a second core network to access a second set of services not provided by the first core network.

Certain aspects of the present disclosure provide a computer readable medium having instructions stored thereon. The instructions are executable by one or more processors for causing a user equipment (UE) to receive information regarding a first set of services provided by a first core network, and taking action to reselect from the first core network to a second core network to access a second set of services not provided by the first core network.

Aspects generally include methods, apparatus, systems, computer program products, and processing systems, as substantially described herein with reference to and as illustrated by the accompanying drawings.

DETAILED DESCRIPTION

Figure 1:
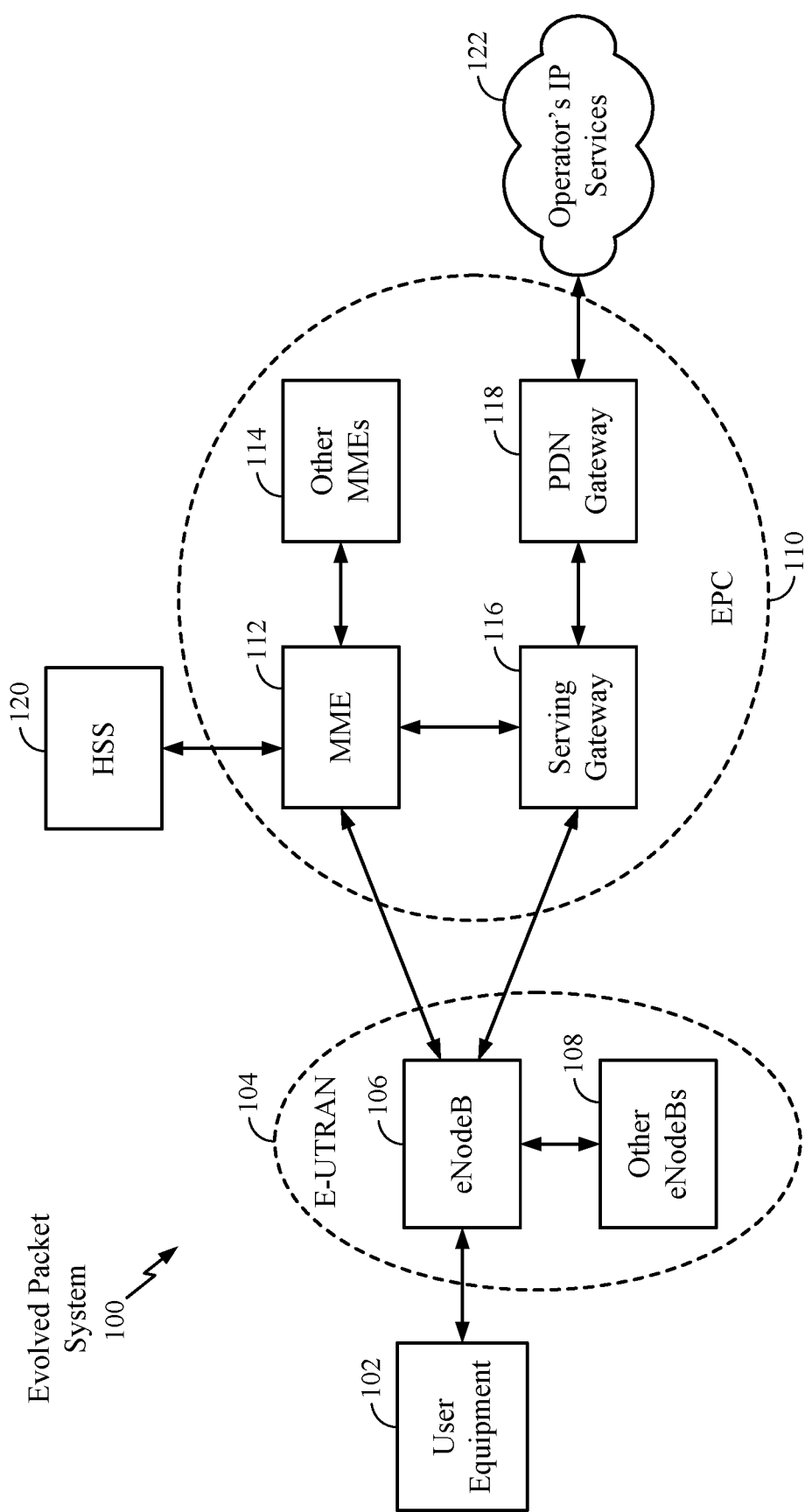
FIG. 1 is a diagram illustrating an example of a network architecture.

Small data over control plane (e.g., connectionless, small data transmission) access may allow for the transmission of data by the UE without the overhead associated with establishing conventional connected access to a network. Certain devices may, for the most part, use connectionless data transmission (e.g., for short updates and/reports). Once in a while, these devices may require a larger data transaction involving data bearers (e.g., software updates). Aspects of the present disclosure provide techniques for selecting/reselecting a core network based on a UE's requested services.

According to aspects of the present disclosure, devices engaging in small data over control plane may be served by a dedicated, combined Control Plane and User Plane Core Network (CN) Node. The standardized, dedicated CN may provide a specific set of services. According to one non-limiting example, a dedicated CN may provide only small data over control plane transmission and may not support data bearers. As will be described in more detail herein, a UE may receive an indication of services provided by a first core network. The UE may take action to reselect from the first core network to a second core network to access a set of services not provided by the first core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced. For example, a UE 102 may perform the techniques described herein. According to aspects, the UE may support small data over control plane transmission services (e.g., connectionless small data transmission) and may, once in a while, require larger data transactions with data bearers. As will be described in more detail herein, the UE may connect to a core network via an MME when data bearer support is desired and may connect to a simplified, dedicated core network (not illustrated) which does not support data bearers when the UE desires a service not provided by the currently-connected core network.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultra book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, an entertainment device, an appliance, a vehicle/automobile component, or some other suitable terminology.

The eNB 106 is connected by an S1 interface to the EPC 110. The EPC 110 includes a Mobility Management Entity (MME) 112, other MMES 114, a Serving Gateway 116 (Serving Gateway Node, SGN 116), and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
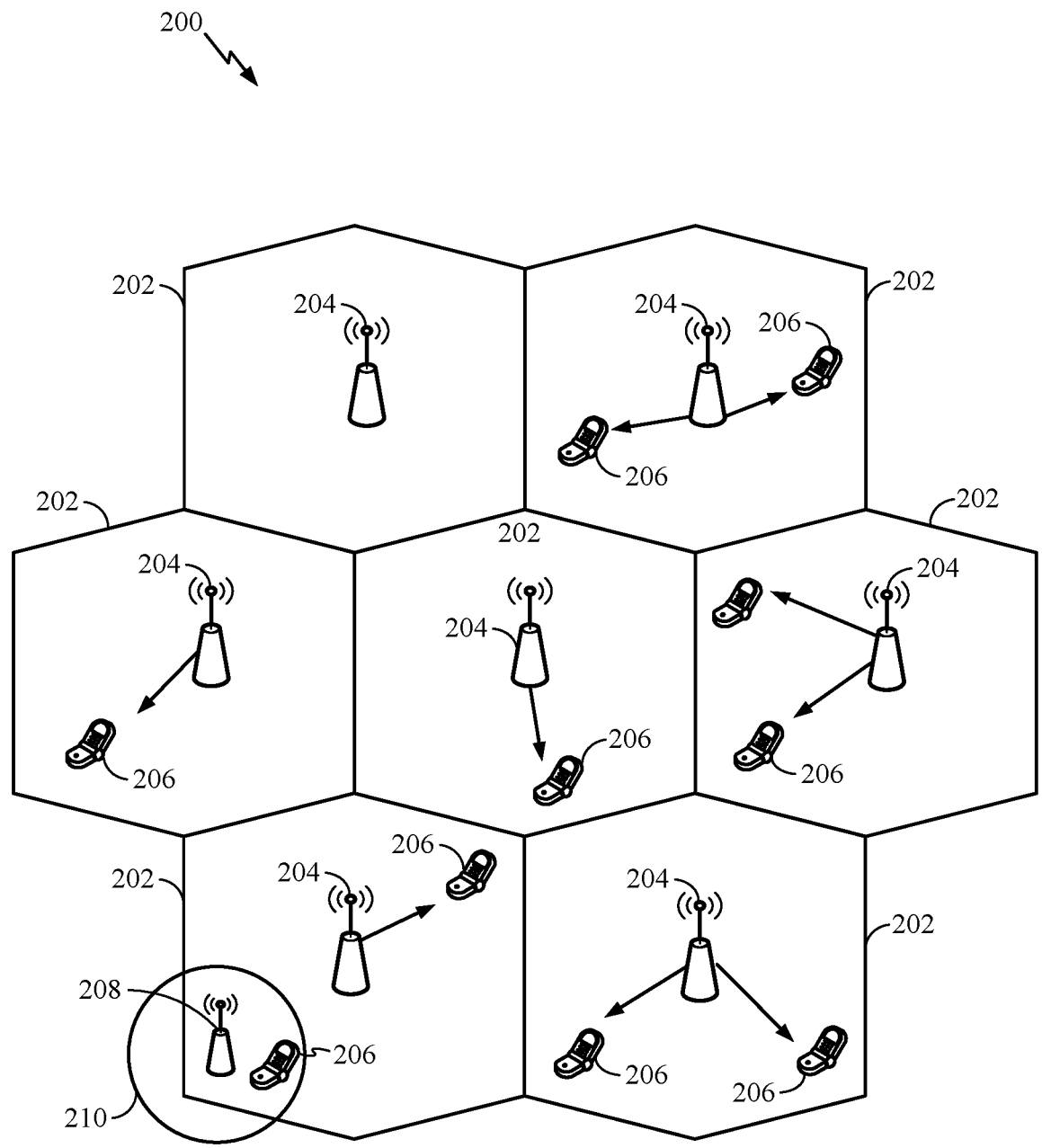
FIG. 2 is a diagram illustrating an example of an access network.

FIG. 2 is a diagram illustrating an example of an access network 200 in an LTE network architecture in which aspects of the present disclosure may be practiced. UE 206 may be configured to receive information regarding a first set of services provided by a first core network and take action to reselect from the first core network to a second core network to access a second set of services not provided by the first core network.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200 yet a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In certain cases, a UE 206 that is at the cell edge of a cell 202 may not efficiently communicate on the UL with its serving eNB 204 due to power limitations, UL interference etc. In certain aspects of the present disclosure, a UE 206 may participate with one or more other UEs in the cell, in cooperative uplink transmission to the serving eNB 204. This may lead to significant cell-edge performance gain. The serving eNB 204 may determine different groups for a plurality of UEs 206 participating in cooperative uplink transmission to the eNB 204, and transmit mode configurations indicating whether or not UEs 206 in each group are configured to transmit data as a data source or to relay data received from another UE 206 configured to transmit data as a data source. Each UE 206 may determine, for each TTI, at least one operation to perform for the cooperative uplink transmission based, at least in part, on a group number of a group to which the UE belongs and an index of the TTI.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
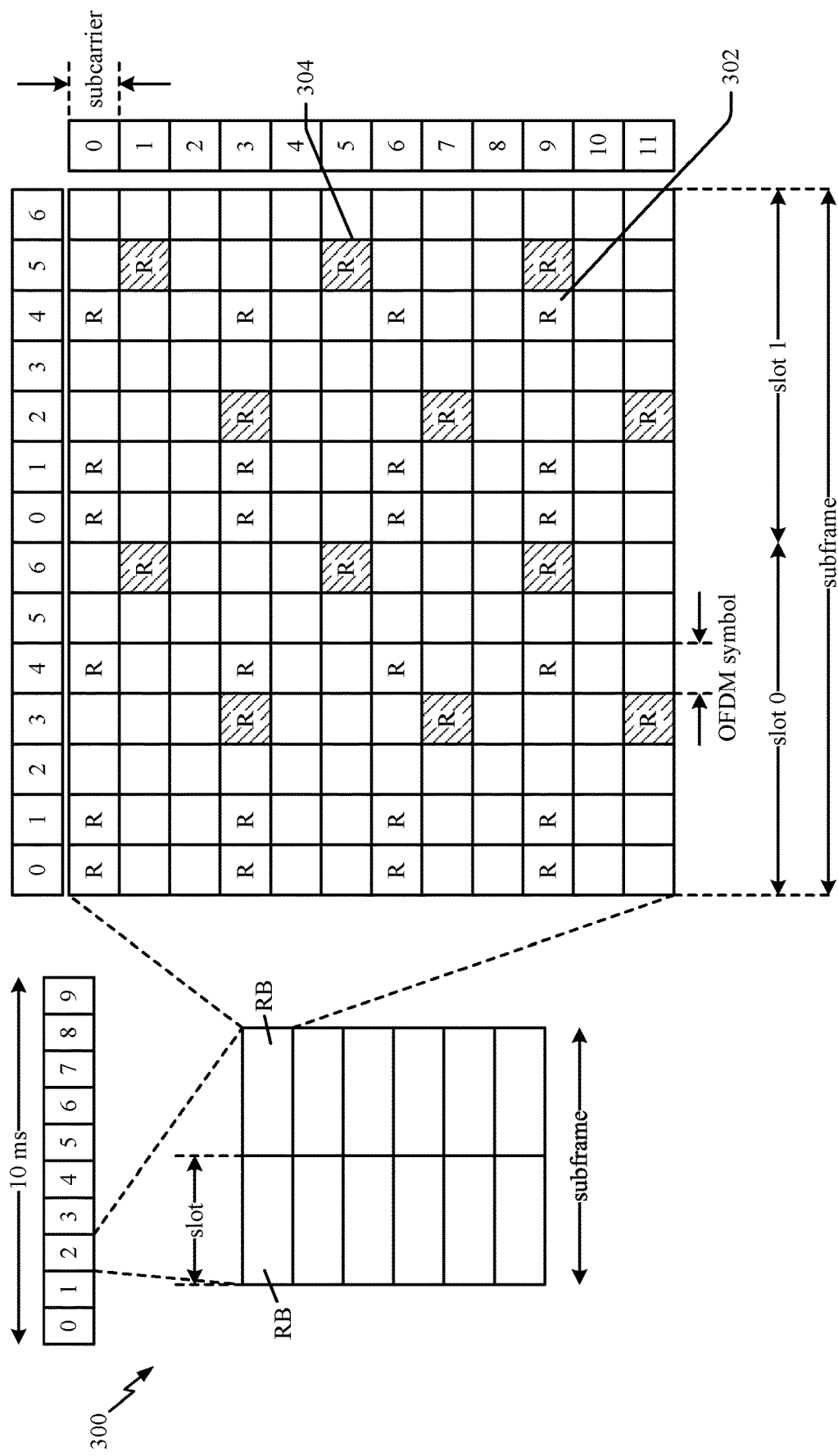
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
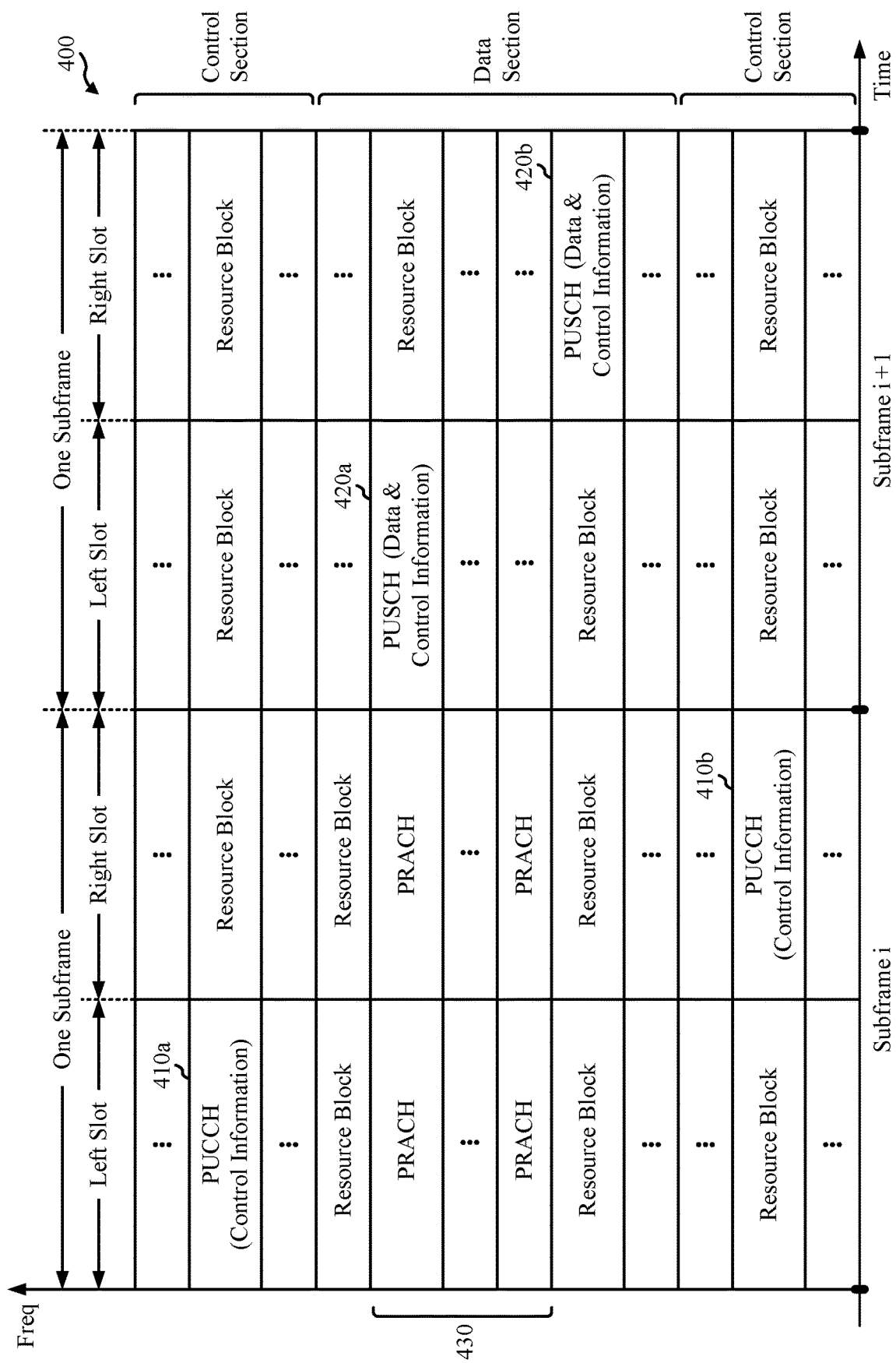
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
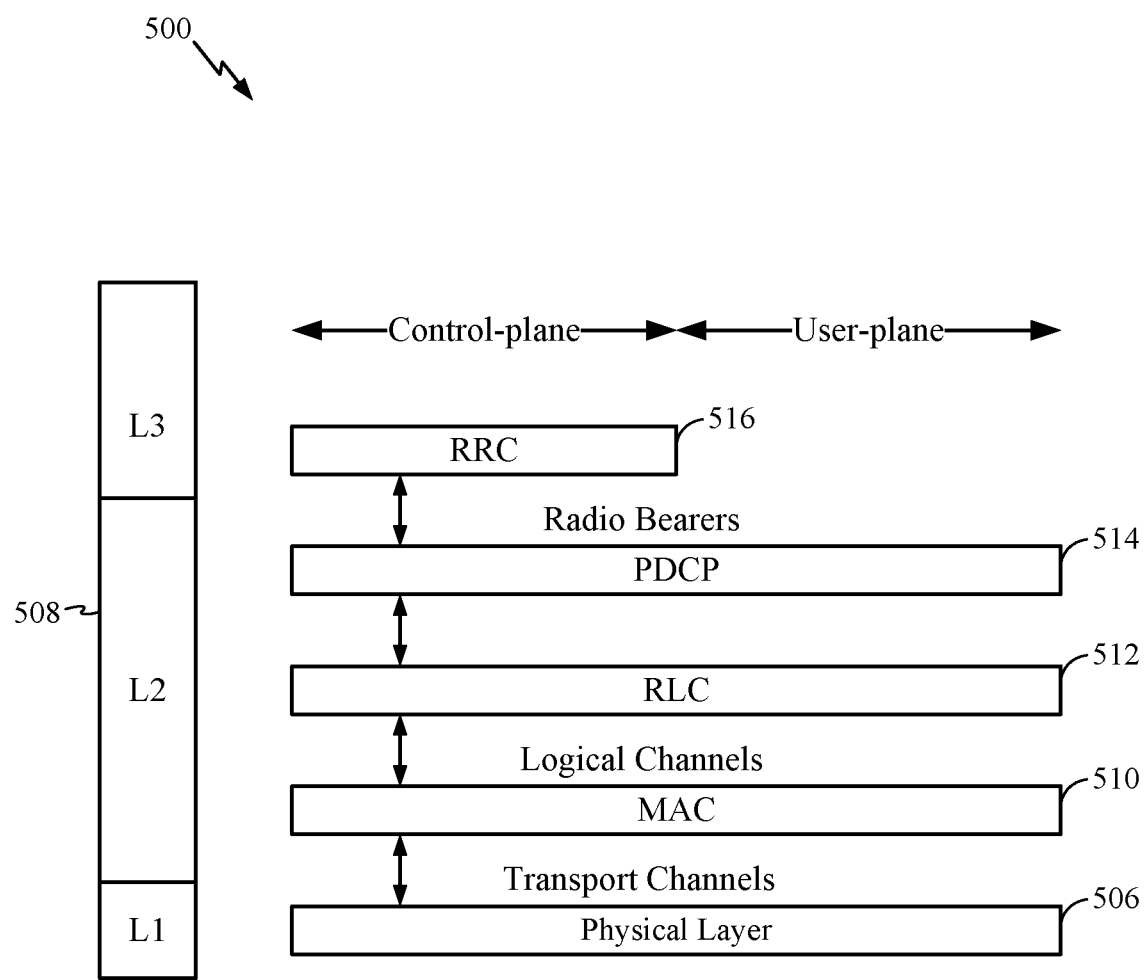
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
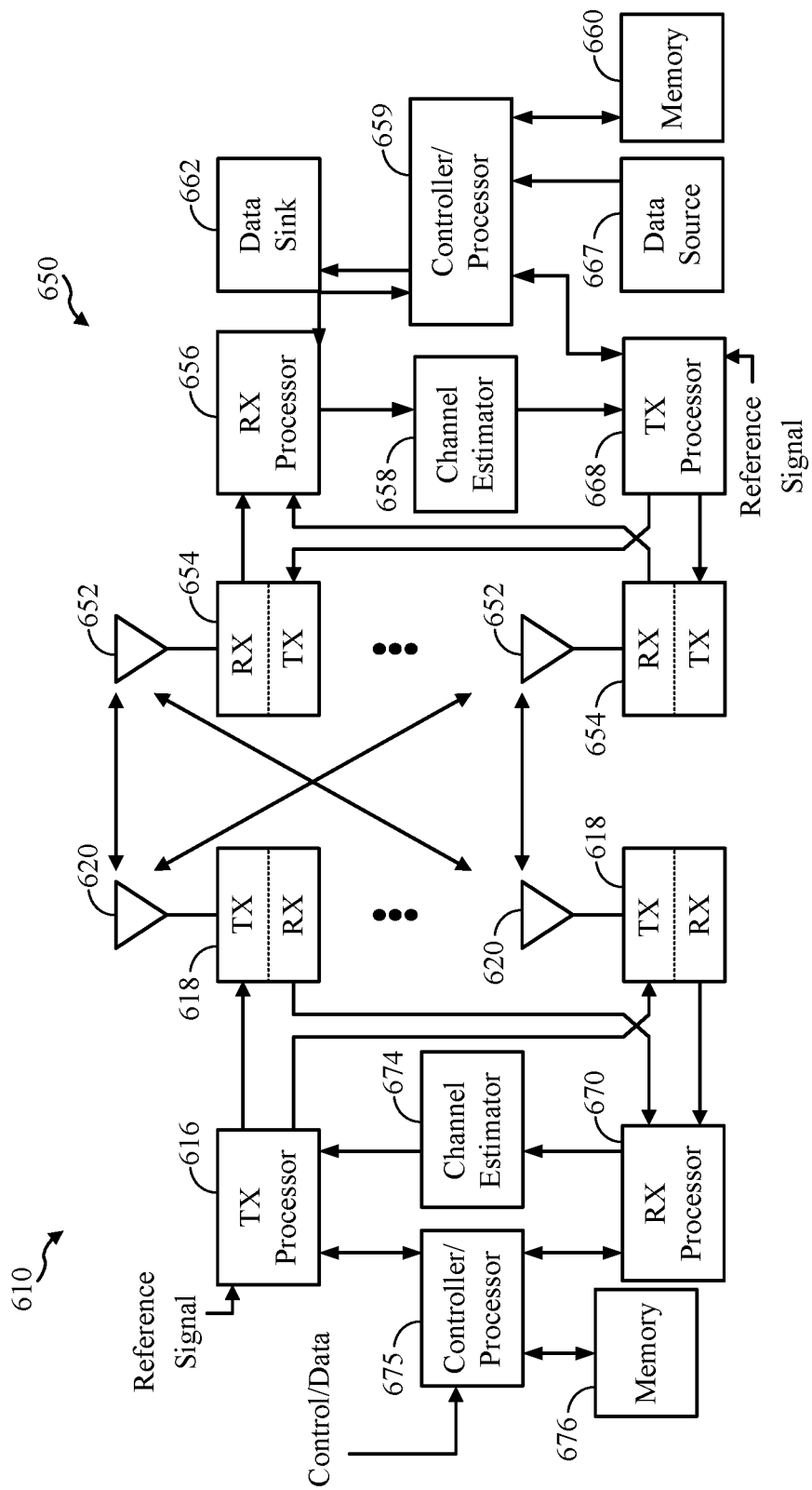
FIG. 6 is a diagram illustrating an example of a base station and user equipment in an access network, in accordance with certain aspects of the disclosure.

FIG. 6 is a block diagram of an eNB 610 in communication with a UE 650 in an access network, in which aspects of the present disclosure may be practiced. For example, the UE 650 may receive information regarding a first set of services provided by a registered first core network and the UE may take action to reselect from the registered first core network to another a second core network to access a second set of services not provided by the registered first core network. In aspects, the antenna 652, Rx/Tx 654, controller/processor 659, RX processor 656, TX processor 668, and/or memory 660 as illustrated in FIG. 6 may perform aspects described herein and illustrated in the accompanying figures.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively.

Figure 10:
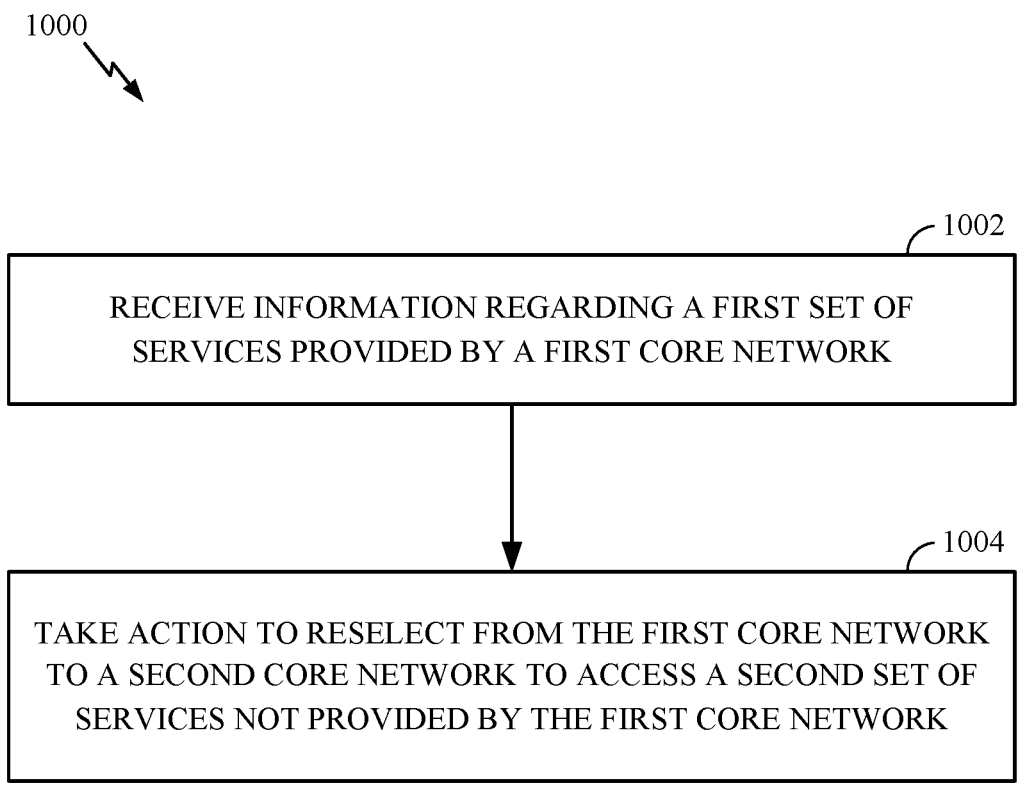
FIG. 10 illustrates example operations which may be performed by a UE, in accordance with aspects of the present disclosure.

The controller/processor 659 and/or other processors and modules at the UE 650 may perform or direct operations, for example, operations 100 in FIG. 10, and/or other processes for the techniques described herein for supporting network reselection. The memory 660 may store data and program codes for the UE 650, accessible and executable by one or more other components of the UE 650.

RESELECTION BETWEEN REGULAR AND DEDICATED CORE NETWORKS

As will be described in more detail herein, a UE may be connected to a first core network and may receive information regarding one or more sets of services provided by the first core network. The UE may determine, recognize, and/or identify that it would like a set of services not provided by the first core network. In response, the UE may take one or more steps to reselect from the first core network to a second core network, wherein the second core network provides the desired set of services.

Dedicated core network (dedicated CN, DCN) information may allow a UE to identify sets of services provided by a core network. Services the UE requests may be indicated using a dedicated CN identification. The dedicated CN identification may have a standardized range of scalar values that define services. Accordingly, if a dedicated CN identification is provided, the network may know what services the UE is requesting. In this manner, there may be a standardized set of values that identify specific services the UE is requesting.

As described above, MTC UEs may communicate with a base station, another remote device, or some other entity. Machine type communications may involve one or more entities that do not necessarily need human interaction. Examples of MTC devices include various wireless sensors, monitors, detectors, meters, or other type data monitoring, generating, or relaying devices that may be expected to operate (possibly unattended) for years on a single battery charge. MTC UEs may operate in a Cellular Internet of Things (CIOT), whereby UEs may collect and transmit data.

Due to these functions, CIOT UEs may have different characteristics as compared to non-CIOT UEs. For example, CIOT UEs may transmit small amounts of data infrequently. At any given time, a large number of CIOT UEs may be in an idle mode (e.g., EPC Connection Management (ECM) idle mode). CIOT UEs may have less mobility management signaling due to, for example, low mobility and/or an extended periodic Tracking Area Update (pTAU) timer.

Small data over control plane transmissions (e.g., connectionless, small data access) may allow for the transmission of data without the overhead associated with establishing conventional connected access to a network. Therefore, according to aspects of the present disclosure, certain devices such as CIOT UEs may be served by a dedicated core network (dedicated CN, DCN), such as a combined Control Plane and User Plane. Standardized, dedicated CNs may offer a specific set of services.

According to one example, a dedicated CN may provide only small data over control plane transmission and may not support data bearers. As described above, there may be devices which, for the most part, use small data over control plane, for example, for short updates/reports. Once in a while, these devices may require a larger data transaction involving data bearers (e.g., software updates). Aspects of the present disclosure provide techniques for selecting/reselecting a core network based on a UE's requested services.

According to aspects, a UE may transmit an indication to an RRC sublayer (e.g., RRC sublayer 516 of FIG. 5) when it desires to connect to a network for small data over control plane transmission (e.g., the UE does not need data bearer support). For example, a UE may request a connection to a simplified, dedicated node which may combine features of a traditional MME (e.g., 112 of FIG. 1) and Serving Gateway (e.g., 116 of FIG. 1). According to aspects, this dedicated CN node may be referred to as a CIOT Service Gateway Node (C-SGN). Upon receiving this indication or request, the radio access network may connect to the C-SGN, if available. If a C-SGN is not available, the UE may connect to the MME.

Through Non-Access Stratus (NAS) signaling, the UE may be aware of whether it is connected to an MME or a simplified, dedicated CN node. As will be shown in FIGS. 7-9 and described in more detail herein, the UE may receive an attach accept message from the core network node (e.g., MME, C-SGN) to which the UE is attached. This message may indicate the CN node's capabilities. For example, an attach accept message from the MME may indicate support for data bearers and an attach accept message from the C-SGN may indicate limited capabilities, such as support for small data over control plane transmission services.

As will be described with reference to FIG. 8, when a UE is connected to the C-SGN and desires to begin mobile originated (MO), bearer supported communication, the UE may initiate a tracking area updating (TAU) procedure with an indication to connect to the MME, an indication to connect to core network that supports bearer context, or an indication not to connect to a dedicated core network (e.g., C-SGN). The RAN node (e.g., base station transceiver, or eNB) may identify a CN which supports such MO communication and may begin an MME selection procedure.

As will be described with reference to FIG. 9, when a UE is connected to the MME and desires a set of services not provided by the MME such as small data over control plane transmission services, the UE may transmit an indication to connect to the C-SGN or an indication to connect to CN that supports this service. The RAN node may identify a CN that is a C-SGN or which supports small data over control plane transmissions and may begin a CN reselection procedure from the MME to a C-SGN.

Figure 7:
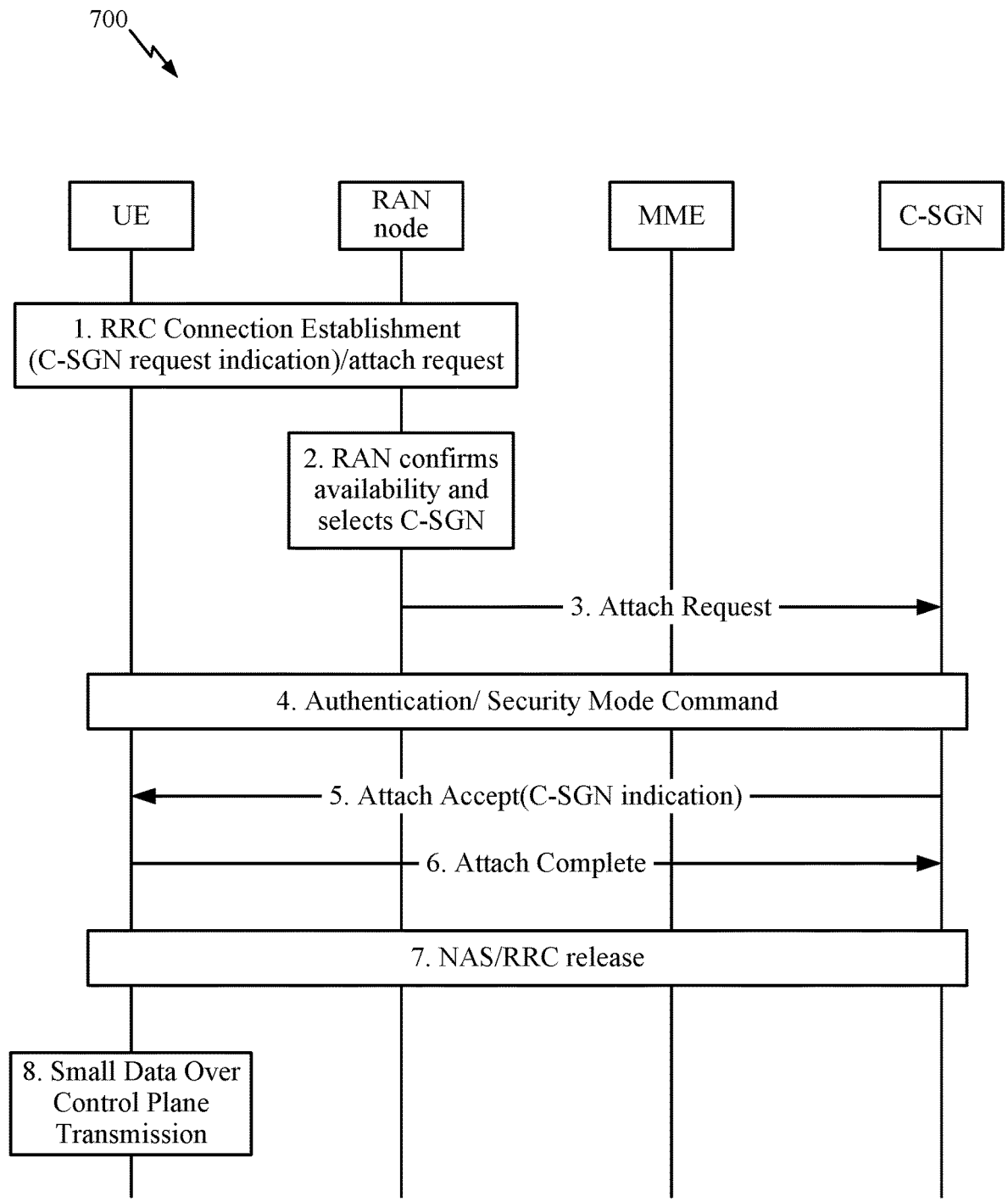
FIG. 7 illustrates an example call flow for an initial attach procedure, in accordance with aspects of the present disclosure

FIG. 7 illustrates an example call flow 700 for an initial attach procedure, according to aspects of the present disclosure. At Step 1, the UE may attach to the RAN node and may request an indication for attaching to a C-SGN. The RAN node may include, for example, a base station transceiver or an eNB. At Step 2, the RAN node may confirm availability of the C-SGN. The RAN node may select the C-SGN for providing network services to the UE. At Step 3, the RAN node may send an attach request message to the C-SGN. Thereafter, at Step 4, authentication may occur between the C-SGN and the UE.

At Step 5, the UE may receive an attach accept indication, indicating the C-SGN and its capabilities. At Step 6, the UE may transmit an attach complete message to the C-SGN. At Step 7, the NAS/RRC may be released. At Step 8, the UE may be connected to the C-SGN with small data over control plane transmission services enabled.

Figure 8:
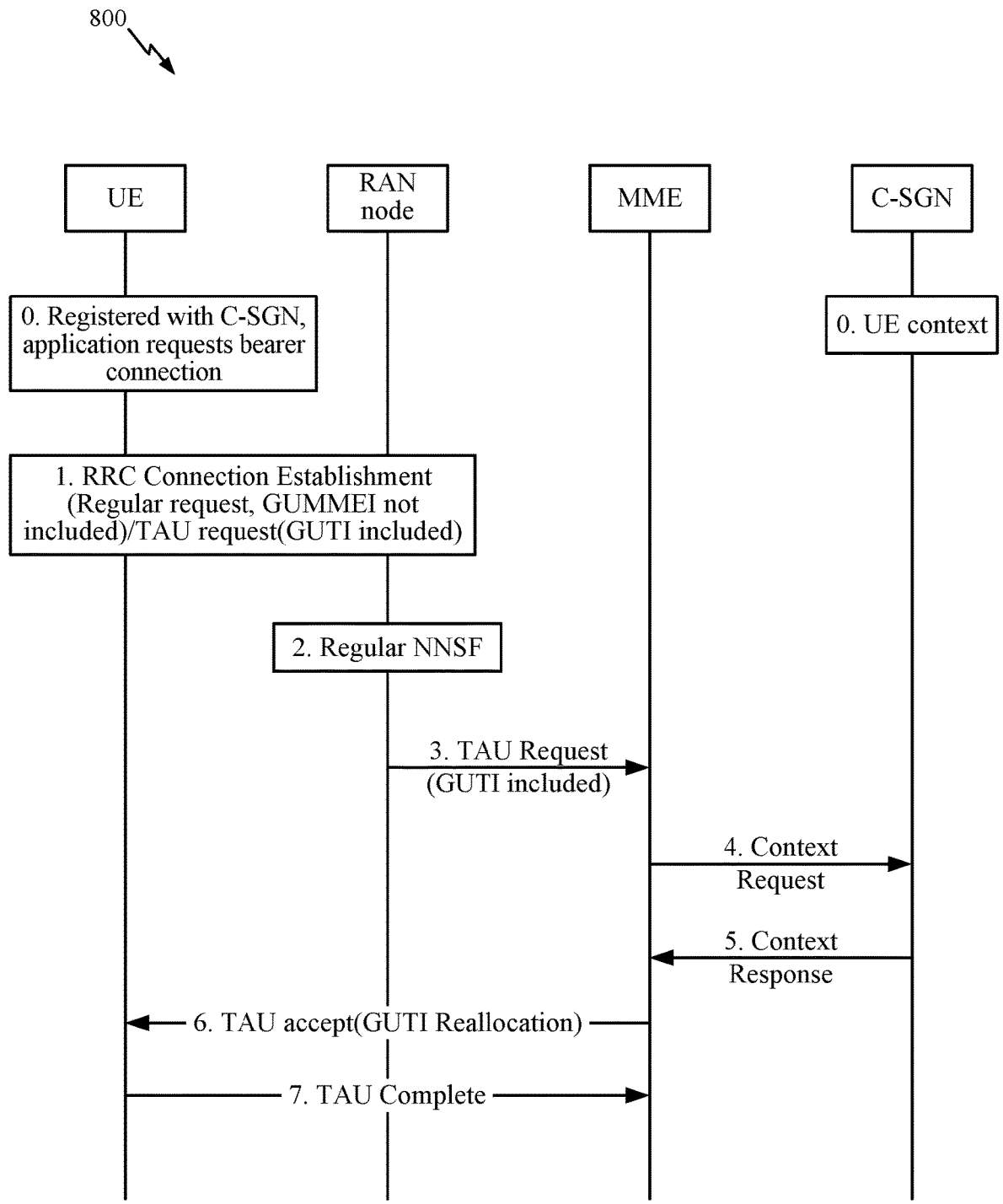
FIG. 8 illustrates an example call flow for reselection of a core network, in accordance with aspects of the present disclosure.

FIG. 8 illustrates an example call flow 800 for reselection of the CN from C-SGN to MME, according to aspects of the present disclosure. Initially, at Step 0, the UE may be registered with the C-SGN (see e.g., Step 8 of FIG. 7) and the C-SGN may have the UE's context. At Step 1, the UE may desire services that are not provided by the C-SGN, such as services that use a bearer connection. Therefore, at Step 1, the UE may transmit a registration update request/indication to the RAN node for connection to the MME.

According to an example, the registration update request at Step 1 may not include an identifier associated with the currently-connected CN node. According to aspects, temporary IDs associated with the CN node such as a Globally Unique Mobility Management Entity Identifier (GUMMEI) may not be included in the registration update request. The ID associated with the current CN may not be provided to the RAN node, so that the RAN node may select a different CN (e.g., select the MME in FIG. 8). Therefore, as illustrated in FIG. 8, the UE may transmit a registration update request without including a GUMMEI.

Additionally, the UE may transmit a TAU request with a Globally Unique Temporary UE ID (GUTI). According to aspects, the UE may identify itself to the RAN node with a permanent identifier associated with the UE (instead of a temporary identifier), which may trigger network selection. According to aspects, the UE may provide information regarding the serving CN so that the new CN may retrieve the UE's context including security context and/or mobility management context. In this example, the UE may provide information regarding the C-SGN in the registration update, so that the MME may retrieve the UE's context from the C-SGN.

At Step 2 in FIG. 8, the RAN node may perform a NAS node selection function (NNSF). At Step 3, the RAN node may transmit a TAU request including the GUTI assigned to the UE. At Step 4, the MME may request the UE's context from the C-SGN. At Step 5, the C-SGN may transmit a context response. Thereafter, at Step 6, the MME may transmit a TAU accept, including the GUTI reallocation and MME capabilities, to the UE. At Step 7, TAU may complete and the UE may begin data bearer services with the MME.

Figure 9:
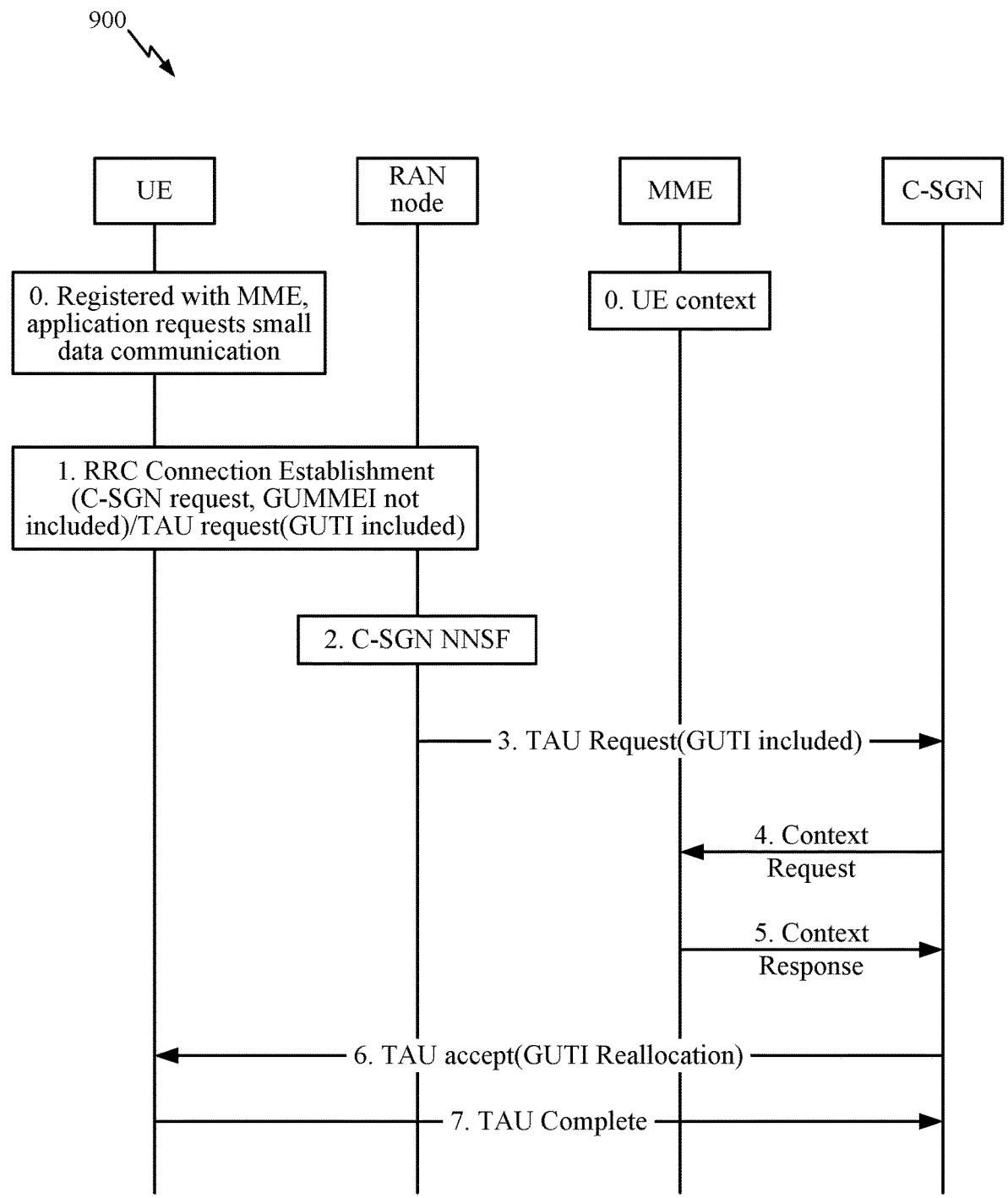
FIG. 9 illustrates an example call flow for reselection of a core network, in accordance with aspects of the present disclosure.

FIG. 9 illustrates an example call flow 900 for reselection of the CN from the MME to C-SGN, according to aspects of the present disclosure. Initially, at Step 0, the UE may be registered with the MME (see e.g., FIG. 8). Additionally, at Step 0, the MME may have the UE's context, and the UE may request support for a service not provided by the MME, such as, for example, small data over control plane transmission.

At Step 1, the UE may transmit a registration update request for a specific service the UE seeks to acquire that is not provided by the MME. For example, the UE may transmit a C-SGN request, as shown in Step 1. The request may not include an ID associated with the current CN, such as for example, the GUMMEI. The UE may also transmit a TAU request message with the GUTI. As described above, according to aspects, the ID associated with the current CN may not be provided to the RAN node, so that the RAN node may select a different CN (e.g., may select a C-SGN in FIG. 9). As described above, according aspects, instead of a temporary identifier, the UE may identify itself to the RAN node with a permanent identifier, which may trigger network selection. The UE may provide information regarding the MME in the registration update, so that the C-SGN may retrieve the UE's context from the MME.

Returning to FIG. 9 at Step 2, the RAN node may perform a C-SGN NNSF. At Step 3, the RAN node may transmit a TAU request including the UE's GUTI. At Step 4, the C-SGN may request the UE's context. At Step 5, the MME may transmit the requested UE's context. At Step 6, the C-SGN may transmit a TAU accept including the GUTI reallocation and the C-SGN capabilities, to the UE. At Step 7, TAU may complete, and the UE may begin small data over control plane transmission services with the C-SGN.

FIG. 10 illustrates example operations 1000, which may be performed by a UE, according to aspects of the present disclosure. UE 102 in FIG. 1 and/or UE 206 in FIG. 2 may perform the features described herein and illustrated in FIGS. 7-10. The UE may include one or more components of UE 650 in FIG. 6. The antennas 652, Rx/Tx 654, controller/processor 659, RX processor 656, TX processor 668, and/or memory 660 of the UE 650 illustrated in FIG. 6 may perform aspects described herein.

The UE may support different sets of services. Different core networks may support the sets of services. Examples of sets of services include communication on data bearers and small data over control plane transmission services.

At 1002, the UE may receive information regarding a first set of services provided by a first core network. At 1004, the UE may take action to reselect from the first core network to a second core network to access a second set of services not provided by the first core network. Aspects of the present disclosure refer to small data over control plane transmission services and data bearer services as non-limiting examples of sets of services a UE may use. Aspects described herein may apply to reselecting a core network based on a UE's desire for any set of services.

As an example, the UE may be connected to the MME which supports data bearers, and may wish to reselect to a dedicated CN, such as a C-SGN. Alternatively, the UE may be connected to the C-SGN and may wish to reselect to the MIME. In any case, the UE may receive information regarding the set of services provided by the registered CN (e.g., data bearers/small data over control plane transmission services). The UE may also receive a temporary ID which may identify the CN element. For example, the UE may receive a SAE-Temporary Mobile Subscriber Identity (S-TMSI), GUTI, GUMMEI, and/or any other temporary identifier which may be used to identify the CN element.

When the UE desires services that a currently serving CN may not provide, the UE may initiate a registration update procedure to change or reselect the serving CN. As described above, and illustrated in FIGS. 8 and 9, the UE may initiate a radio access connection without indicating an identifier associated with the CN element. The ID may be a temporary identifier.

According aspects, the UE may identify itself to the RAN node with a permanent identifier (instead of a temporary identifier), which may trigger network selection. The UE may also indicate, to the RAN node, the type of service desired, which may allow the RAN element to perform network selection to a CN element that supports the desired service. The indication of services desired by the UE may be a scalar value, such as a core network identification value.

The UE may provide information regarding the last serving CN to the RAN element, for example in a registration update message. This may allow the new CN to retrieve the UE's context (e.g., security context, mobility management context) from the CN to which the UE was previously connected.

As described herein, aspects of the present disclosure provide techniques for reselection of a CN based on services desired by a UE. When a UE desires services not available on a currently-connected CN, the UE may transmit an establishment request message requesting the services desired. The request may not include an identifier of the currently-connected CN, in an effort to allow the RAN node to select a CN which offers the desired services. While aspects of the present disclosure are described with reference to a CN which supports data bearers and a CN which supports connectionless small data transmissions, the techniques described herein are not limited to these services. As such, aspects of the present disclosure may be applied to any type of dedicated CN.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

According to aspects the means described and recited herein may be performed by one or more components of a UE, such as UE 102 in FIG. 1 and/or UE 206 in FIG. 2. The UE may include one or more components illustrated in FIG. 6. For example, the means for receiving, the means for taking action, means for initiating a registration update, means for indicating, to a RAN node, a permanent identifier associated with the UE, means for providing information regarding the first core network in a registration update, and means for transmitting a TAU request message may be performed by one or more of the antenna 652, Rx/Tx 654, controller/processor 659, RX processor 656, TX processor 668, and/or memory 660.

The invention claimed is:

1. A method for wireless communication by a machine-type communication (MTC) user equipment (UE), comprising:
receiving an attach accept message from a dedicated core network, wherein the attach accept message indicates that the dedicated core network supports a first set of services including small data over control plane transmissions and does not support data bearer services; and
taking action to reselect from the dedicated core network to a second core network to access support for data bearer services,
wherein taking the action comprises initiating a registration procedure, wherein the registration procedure includes at least one of: an indication to connect to a core network control node, an indication to connect to a core network that supports data bearer services, an indication not to connect to the dedicated core network, or a combination thereof.

2. The method of claim 1, wherein the registration procedure indicates, to a Radio Access Network (RAN) node, a service requested by the UE that is not provided by the dedicated core network.

3. The method of claim 1, wherein:
the registration update procedure does not indicate an identifier associated with the dedicated core network; and
identifier associated with the dedicated core network comprises a Globally Unique MME Identifier (GUMMEI).

4. The method of claim 1, wherein:
the registration update procedure does not indicate an identifier associated with the dedicated core network; and
the identifier associated with the dedicated core network comprises a temporary identifier.

5. The method of claim 4, wherein taking the action further comprises initiating a tracking area update (TAU) request transmitting an indication, to a radio access network (RAN) node, of a permanent identifier associated with the UE.

6. The method of claim 5, wherein the TAU request comprises information regarding the dedicated core network.

7. The method of claim 1, wherein the dedicated core network combines a control plane and a user plane.

8. An apparatus for wireless communication by a machine-type communication (MTC) user equipment (UE), comprising:
means for receiving an attach accept message from a dedicated core network, wherein the attach accept message indicates that the dedicated core network supports a first set of services including small data over control plane transmissions and does not support data bearer services; and
means for taking action to reselect from the dedicated core network to a second core network to access support for data bearer services,
wherein the means for taking the action comprises means for initiating a registration procedure, wherein the registration procedure includes at least one of: an indication to connect to a core network control node, an indication to connect to a core network that supports data bearer services, an indication not to connect to the dedicated core network, or a combination thereof.

9. The apparatus of claim 8, wherein the registration procedure indicates, to a Radio Access Network (RAN) node, a service requested by the UE that is not provided by the dedicated core network.

10. The apparatus of claim 8, wherein:
the registration update procedure does not indicate an identifier associated with the dedicated core network; and
identifier associated with the dedicated core network comprises a Globally Unique MME Identifier (GUMMEI).

11. The apparatus of claim 8, wherein:
the registration update procedure does not indicate an identifier associated with the dedicated core network; and
the identifier associated with the dedicated core network comprises a temporary identifier.

12. The apparatus of claim 11, wherein the means for taking the action further comprises means for initiating a tracking area update (TAU) request transmitting an indication, to a radio access network (RAN) node, of a permanent identifier associated with the UE.

13. The apparatus of claim 12, wherein the TAU request comprises information regarding the dedicated core network.

14. The apparatus of claim 8, wherein the dedicated core network combines a control plane and a user plane.

15. An apparatus for wireless communication by a machine-type communication (MTC) user equipment (UE), comprising:
a receiver configured to receive an attach accept message from a dedicated core network, wherein the attach accept message indicates that the dedicated core network supports a first set of services including small data over control plane transmissions and does not support data bearer services; and
at least one processor configured to:
take action to reselect from the dedicated core network to a second core network to access support for data bearer services, wherein the at least one processor is configured to take the action by initiating a registration procedure, wherein the registration procedure includes at least one of an indication to connect to a core network control node, an indication to connect to a core network that supports data bearer services, an indication not to connect to the dedicated core network, or a combination thereof; and
a memory coupled to the at least one processor.

16. The apparatus of claim 15, wherein the registration procedure indicates, to a Radio Access Network (RAN) node, a service requested by the UE that is not provided by the dedicated core network.

17. The apparatus of claim 15, wherein:
the registration update procedure does not indicate an identifier associated with the dedicated core network; and
identifier associated with the dedicated core network comprises a Globally Unique MME Identifier (GUMMEI).

18. The apparatus of claim 15, wherein:
the registration update procedure does not indicate an identifier associated with the dedicated core network; and
the identifier associated with the dedicated core network comprises a temporary identifier.

19. The apparatus of claim 18, wherein the at least one processor is further configured to take the action by initiating a tracking area update (TAU) request transmitting an indication, to a radio access network (RAN) node, of a permanent identifier associated with the UE.

20. The apparatus of claim 19, wherein the TAU request comprises information regarding the dedicated core network.

21. The apparatus of claim 15, wherein the dedicated core network combines a control plane and a user plane.

22. A non-transitory computer-readable medium having instructions stored thereon, the instructions executable by at least one processor for causing a machine-type communication (MTC) user equipment (UE) to:
receive an attach accept message from a dedicated core network, wherein the attach accept message indicates that the dedicated core network supports a first set of services including small data over control plane transmissions and does not support data bearer services; and take action to reselect from the dedicated core network to a second core network to access support for data beater services, wherein the at least one processor is configured to take action by initiating a registration procedure, wherein the registration procedure includes at least one of an indication to connect to a core network control node, an indication to connect to a core network that supports data bearer services, an indication not to connect to the dedicated core network, or a combination thereof.

23. The non-transitory computer-readable medium of claim 22, wherein the registration procedure indicates, to a Radio Access Network (RAN) node, a service requested by the UE that is not provided by the dedicated core network.

24. The non-transitory computer-readable medium of claim 22, wherein the registration procedure indicates, to a Radio Access Network (RAN) node, a service requested by the UE that is not provided by the dedicated core network.

25. The non-transitory computer-readable medium of claim 22, wherein:

the registration update procedure does not indicate an identifier associated with the dedicated core network; and the identifier associated with the dedicated core network comprises a Globally Unique MME Identifier (GUMMEI).

26. The non-transitory computer-readable medium of claim 22, wherein:

the registration update procedure does not indicate an identifier associated with the dedicated core network; and the identifier associated with the dedicated core network comprises a temporary identifier.

27. The non-transitory computer-readable medium of claim 26, wherein the at least one processor is configured to take the action by initiating a tracking area update (TAU) request transmitting an indication, to a radio access network (RAN) node, of a permanent identifier associated with the UE.

28. The non-transitory computer-readable medium of claim 27, wherein the TAU request comprises information regarding the dedicated core network.

29. The non-transitory computer-readable medium of claim 22, wherein the dedicated core network combines a control plane and a user plane.

* * * * *